US009103361B2

(12) United States Patent
Tanabe et al.

(10) Patent No.: US 9,103,361 B2
(45) Date of Patent: Aug. 11, 2015

(54) CLIP

(71) Applicant: HONDA MOTOR CO., LTD, Tokyo (JP)

(72) Inventors: Gen Tanabe, Wako (JP); Haruka Tsuda, Wako (JP); Yusuke Inoue, Wako (JP); Hajime Naoi, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 80 days.

(21) Appl. No.: 13/869,663

(22) Filed: Apr. 24, 2013

(65) Prior Publication Data

US 2013/0283575 A1 Oct. 31, 2013

(30) Foreign Application Priority Data

Apr. 26, 2012 (JP) ................................. 2012-101841

(51) Int. Cl.
| | |
|---|---|
| *F16B 5/07* | (2006.01) |
| *F16B 2/20* | (2006.01) |
| *B62J 17/02* | (2006.01) |
| *F16B 5/00* | (2006.01) |
| *F16B 5/06* | (2006.01) |

(52) U.S. Cl.
CPC . *F16B 2/20* (2013.01); *B62J 17/02* (2013.01); *F16B 5/0056* (2013.01); *F16B 5/07* (2013.01); *F16B 5/0657* (2013.01); *Y10T 24/42* (2015.01)

(58) Field of Classification Search
USPC ....................... 24/DIG. 31, DIG. 32, DIG. 37
See application file for complete search history.

(56) References Cited

U.S. PATENT DOCUMENTS

| 327,407 | A | * | 9/1885 | Oswald | 24/575.1 |
|---|---|---|---|---|---|
| 1,608,807 | A | * | 11/1926 | Ogush | 24/656 |
| 1,757,462 | A | * | 5/1930 | Mack | 411/530 |
| 2,430,985 | A | * | 11/1947 | King | 24/573.11 |
| 3,630,554 | A | * | 12/1971 | Cherniak | 52/713 |
| 4,266,326 | A | * | 5/1981 | Hong | 24/265 WS |
| 8,813,320 | B2 | * | 8/2014 | Zhao | 24/579.11 |

FOREIGN PATENT DOCUMENTS

JP 2006-214479 A 8/2006

* cited by examiner

*Primary Examiner* — Jack W Lavinder

(74) *Attorney, Agent, or Firm* — Westerman, Hattori, Daniels & Adrian, LLP

(57) ABSTRACT

A clip includes a clip body, displacement portions, engagement portions and curved protruding portions. The clip body can be accommodated between a first through-hole of a protruding portion of a first object to be fixed and a second object to be fixed. The displacement portions are provided on both end portions of the clip body along a virtual line. The engagement portions are provided at leading end side of the displacement portions so as to engage with the protruding portion when the clip body is pulled out from the first through-hole. The curved protruding portions provided at both end portions of the clip body and each are engaged with a curved corner portion formed in the second object to be fixed when the clip body is pulled out from the first through-hole.

12 Claims, 13 Drawing Sheets

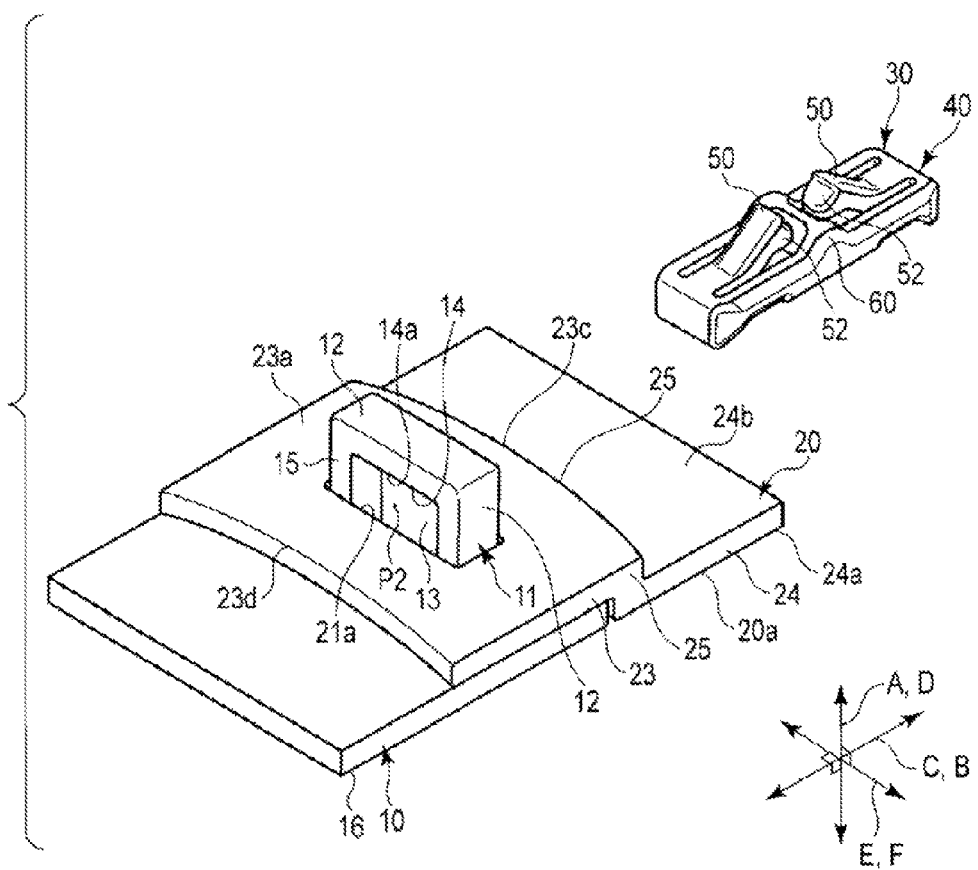
F I G. 2

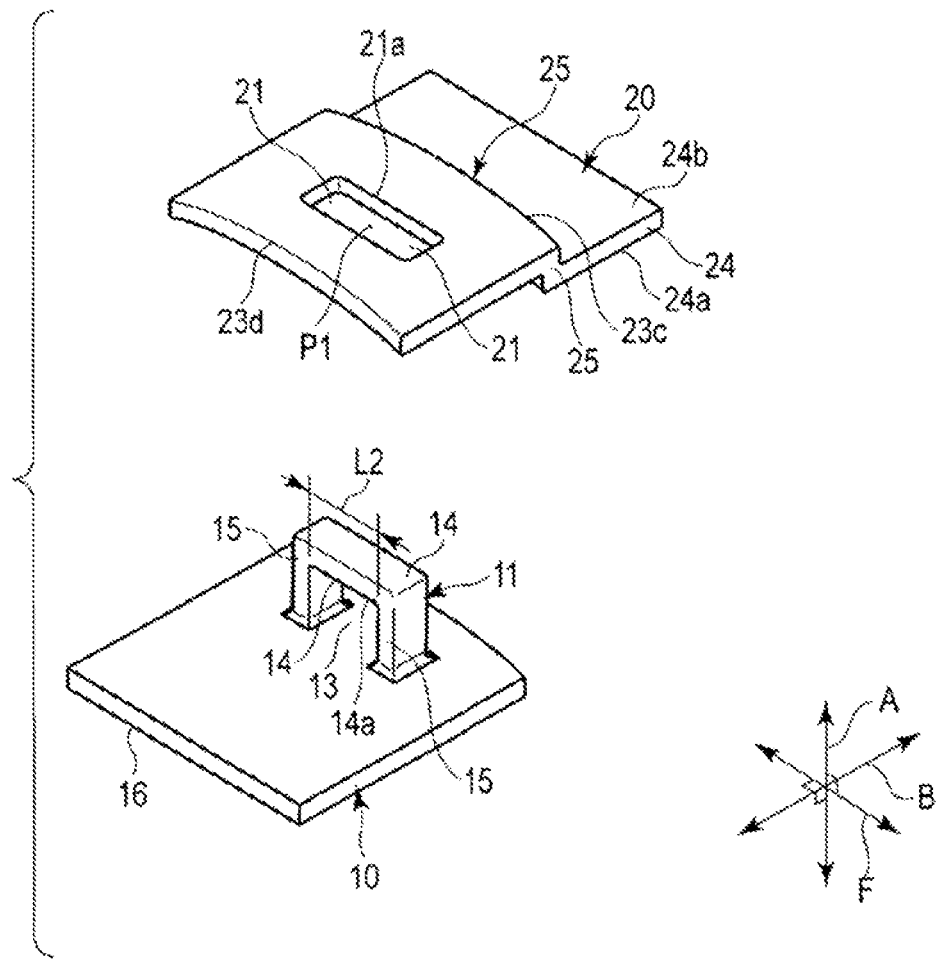
F I G. 3

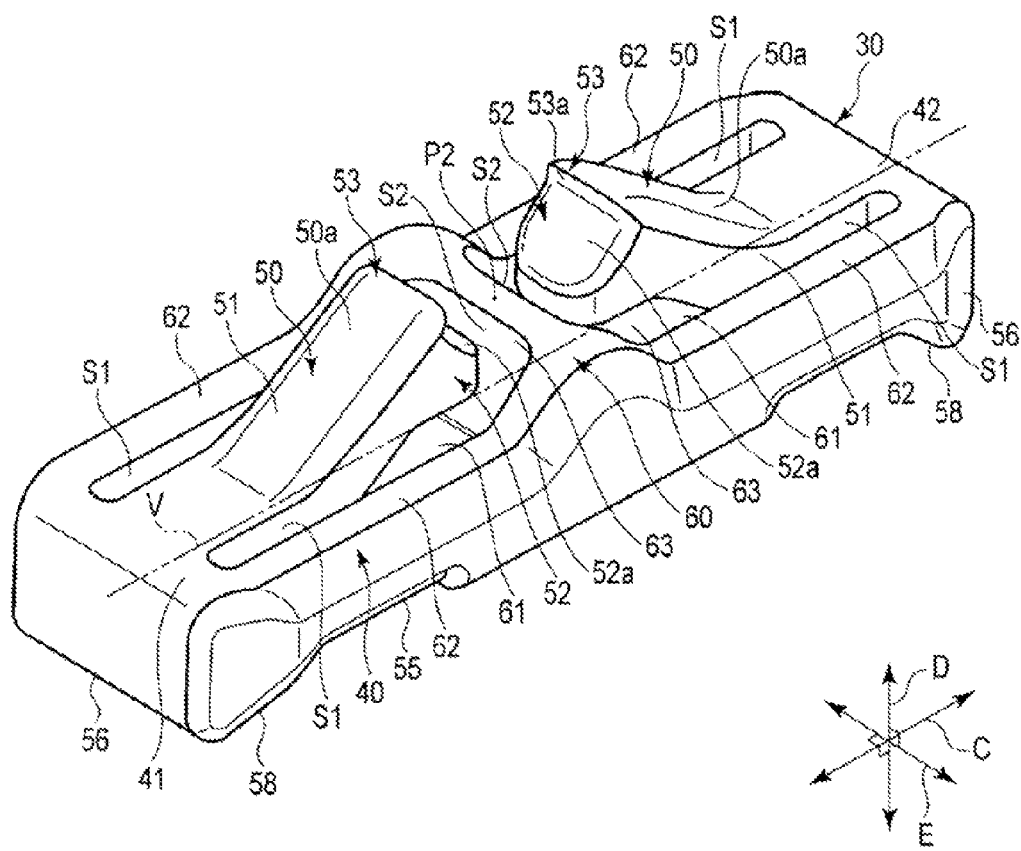
F I G. 4

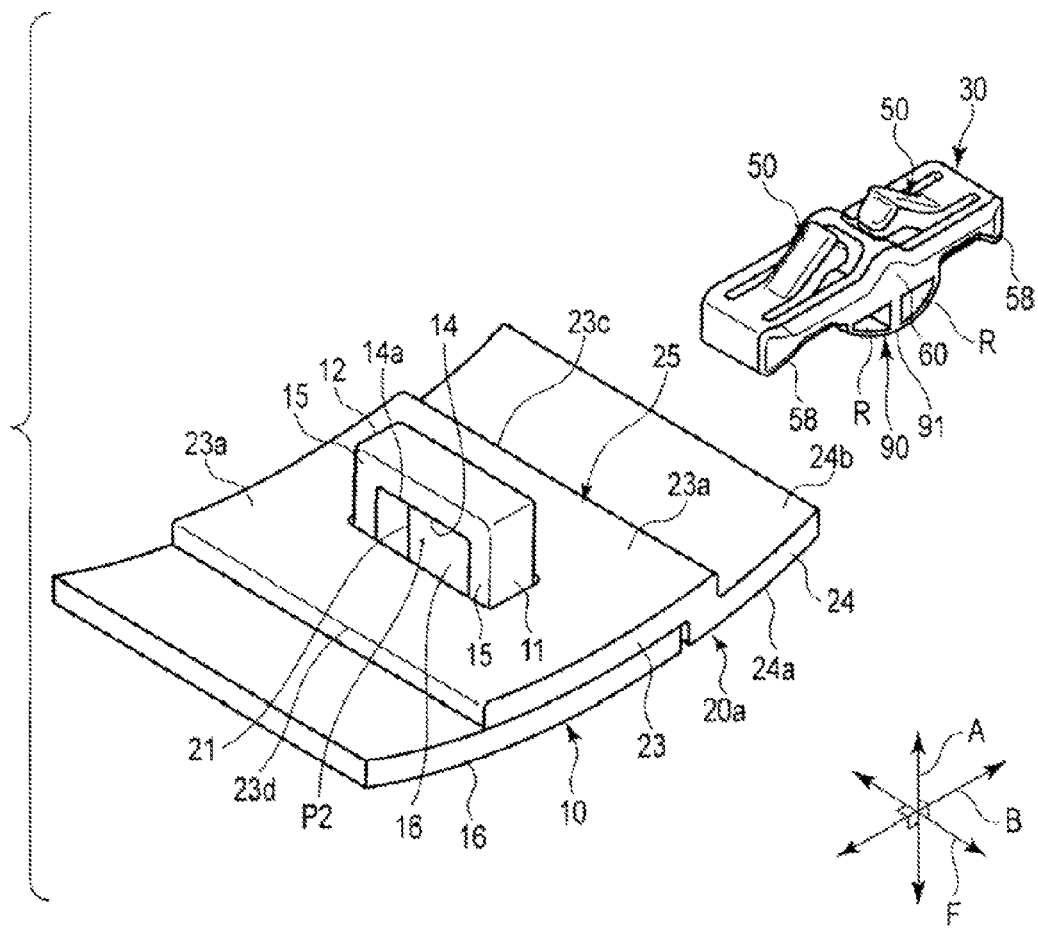
F I G. 10

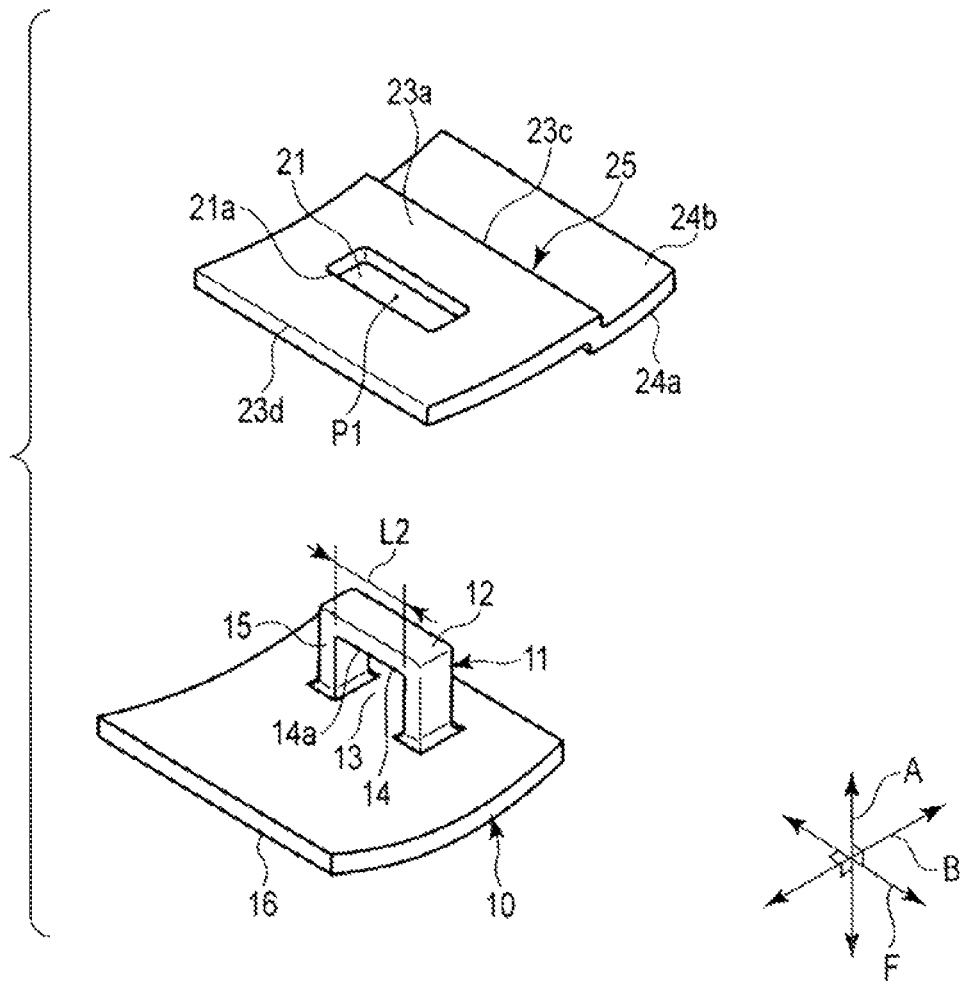
F I G. 11

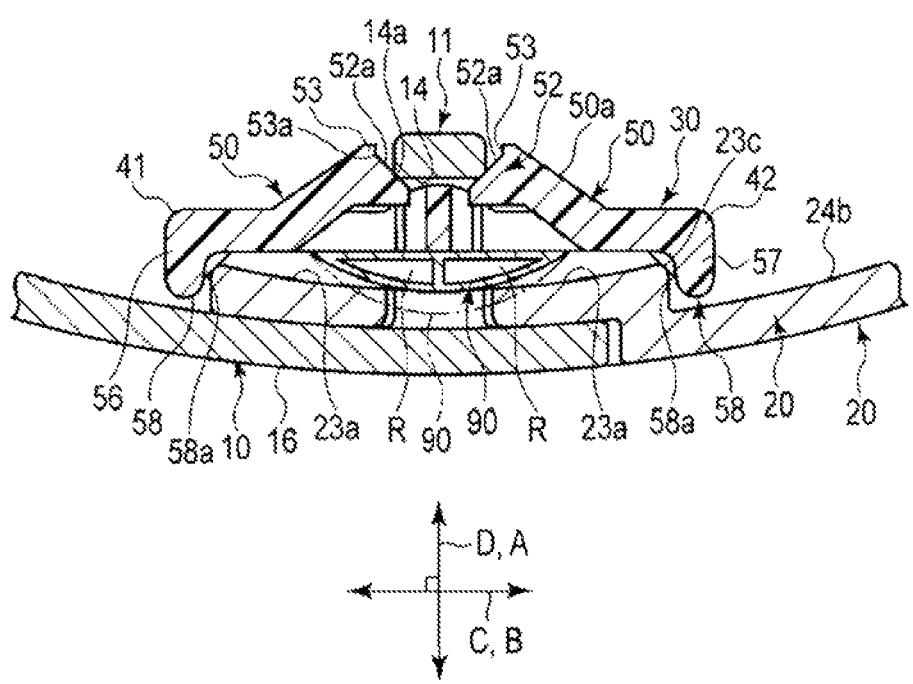
F I G. 13

CLIP

CROSS-REFERENCE TO RELATED APPLICATIONS

This application is based upon and claims the benefit of priority from prior Japanese Patent Application No. 2012-101841, filed Apr. 26, 2012, the entire contents of which are incorporated herein by reference.

BACKGROUND OF THE INVENTION

1. Field of the Invention

The present invention relates to a clip for fixing a plurality of objects to be fixed to one another.

2. Description of the Related Art

Conventionally, there has been proposed a cowl of a motorcycle with a plurality of colors. As a production method of such a cowl, there is a method in which a cowl after molding is painted with two colors. In this method, however, if the cowl is scratched, a backing of the cowl is exposed. Further, there is another production method in which the cowl is obtained by two-color molding. However, this method requires high skill and thus limits design options. Further, production cost tends to be increased.

Meanwhile, there has been proposed a technique in which two different members are fixed to a mounting target object. More specifically, a claw portion having two claws is formed in a first member, and a wedge portion is formed in a second member. The claw portion of the first member is fitted to a fitting hole formed in the mounting target object, and the wedge portion of the second member is inserted between the claws of the claw portion so as to open a space between the two claws.

Assume a case where a member with a plurality of colors, like the cowl, is divided by color into a plurality of parts, and the plurality of parts are fixed to one another. When the technique disclosed in Jpn. Pat. Appln. KOKAI Publication No. 2006-214479 is applied to this case, the claw portion or wedge portion needs to be formed in each of the plurality of parts. In this case, the plurality of parts are subjected to a significant change in shape. Further, in this case, external appearance of the cowl may be impaired. Furthermore, since the plurality of parts are subjected to a significant change in shape, the design options of the cowl become limited.

As described above, in the case where the plurality of parts are fixed to one another, the individual parts are subjected to a significant change in shape, and design options of a product in a state where the plurality of parts are fixed are limited.

BRIEF SUMMARY OF THE INVENTION

According to a first aspect of embodiments, there is provided a clip for fixing a plurality of objects to be fixed in a stacked state containing first and second objects to be fixed. The first object to be fixed is disposed as a lowermost layer and having a protruding portion protruding in the stacking direction and a first through-hole formed in the protruding portion. The second object to be fixed is disposed as an uppermost layer and having a second through-hole formed therein. The clip includes a clip body, displacement portions, engagement portions and curved protruding portions. The clip body can be accommodated between the first through-hole and second object to be fixed in a state where the protruding portion of the first object to be fixed is inserted through the second through-hole of the second object to be fixed. The displacement portions are provided on both end portions of the clip body along a virtual line set with respect to the clip body and extending in a penetrating direction of the first through-hole in a state where the clip body is accommodated in the first through-hole. The displacement portions each extend toward each other and each is elastically deformable toward the clip body. The engagement portions are provided at leading end side of the displacement portions so as to protrude from the clip body. The engagement portions are engaged with the protruding portion of the first object to be fixed when the clip body in an engageable state where it is accommodated in the first through-hole in an attitude in which the vertical line follows the penetrating direction of the first through-hole is pulled out from the first through-hole and are capable of being reduced in protruding amount from the clip body by the elastic deformation of each of the displacement portions. The curved protruding portions are provided at both end portions of the clip body on an opposite side to the protruding side of the engagement portion from the clip body and along the virtual line so as to protrude from the clip body. The curved protruding portions each are engaged with a curved corner portion formed in the second object to be fixed when the clip body in the engageable state is pulled out and protruding in a curved manner toward each other.

According to a second aspect of the embodiments, there is provided a clip for fixing a plurality of objects to be fixed in a stacked state containing first and second objects to be fixed. The first object to be fixed is disposed as a lowermost layer and having a protruding portion protruding in the stacking direction and a first through-hole formed in the protruding portion. The second object to be fixed is disposed as an uppermost layer and having a second through-hole formed therein. The clip includes a clip body, displacement portions, engagement portions, first protruding portions and a second protruding portion. The clip body can be accommodated between the first through-hole and second object to be fixed in a state where the protruding portion of the first object to be fixed is inserted through the second through-hole of the second object to be fixed. The displacement portions are provided on both end portions of the clip body along a virtual line set with respect to the clip body and extend in a penetrating direction of the first through-hole in a state where the clip body is accommodated in the first through-hole. The displacement portions each extend toward each other and each are elastically deformable toward the clip body. The engagement portions are provided at an leading end side of the displacement portions so as to protrude from the clip body. The engagement portion being engaged with the protruding portion of the first object to be fixed when the clip body in an engageable state where it is accommodated in the first through-hole in an attitude in which the vertical line follows the penetrating direction of the first through-hole is pulled out from the first through-hole and are capable of being reduced in protruding amount from the clip body by the elastic deformation of each of the displacement portions. The first protruding portions are provided at both end portions of the clip body on an opposite side to the protruding side of the engagement portion from the clip body and along the virtual line so as to protrude from the clip body. The first protruding portions each are engaged with a corner portion formed in the second object to be fixed when the clip body in the engageable state is pulled out and protruding toward each other. The second protruding portion is provided in the clip body on an opposite side thereof to the protruding side of the engagement portion from the clip body so as to protrude from the clip body.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a perspective view of a state where the clip is separated from the first and second plate members;

FIG. 3 is a perspective view of a state where the first and second plate members are separated;

FIG. 4 is a perspective view of the clip;

FIG. 10 is a perspective view of a state where the clip is separated from the first and second plate members;

FIG. 11 is a perspective view of a state where the first and second plate members are separated;

FIG. 13 is a cross-sectional view of the clip according to the second embodiment, first plate member, and second plate member, taken along line F13-F13 of FIG. 9.

DETAILED DESCRIPTION OF THE INVENTION

Figure 1:
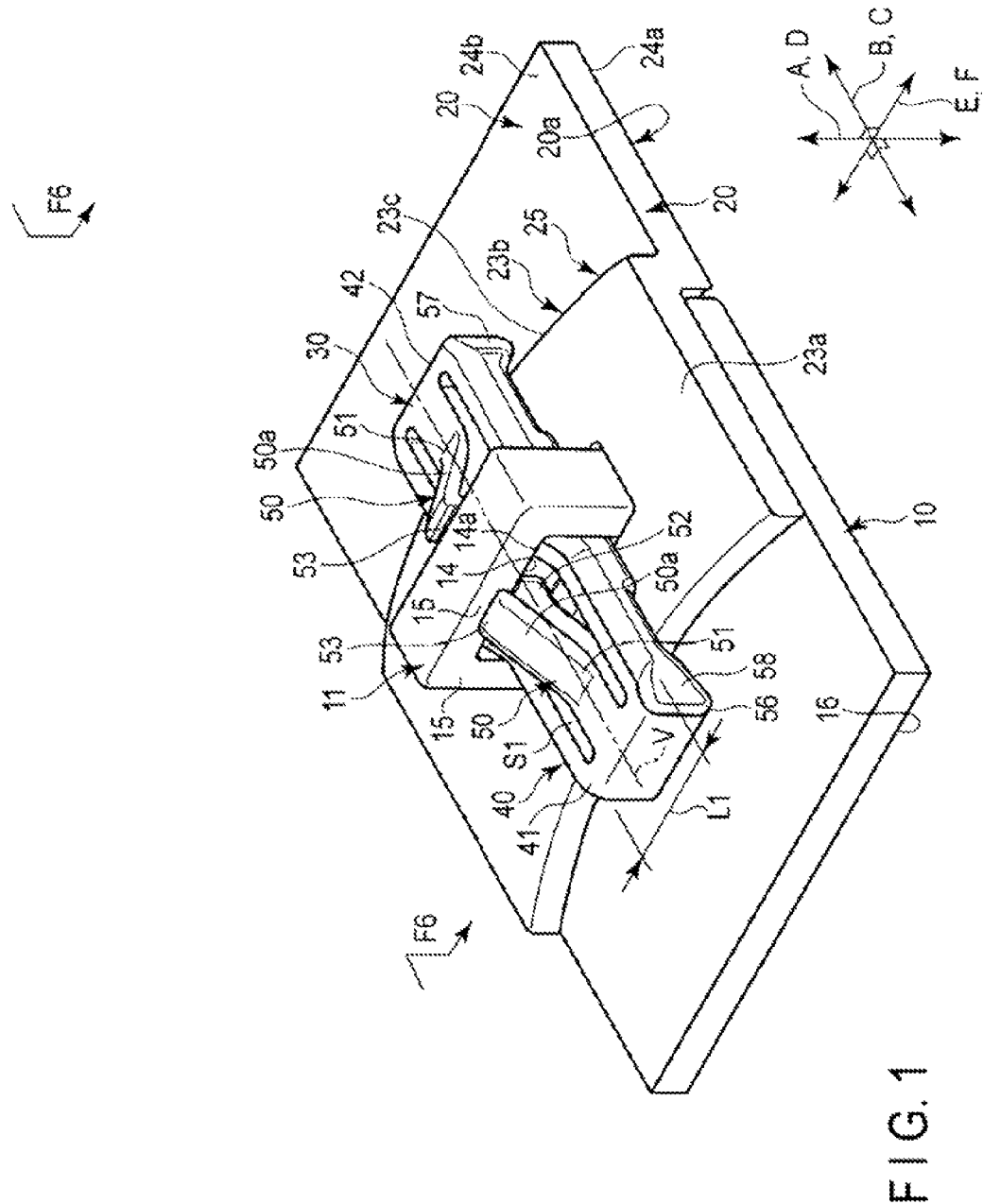
FIG. 1 is a perspective view of a state where a clip according to a first embodiment of the present invention fixes a first plate member and a second plate member to each other.

A clip according to a first embodiment of the present invention will be described with reference to FIGS. 1 to 8. FIG. 1 is a perspective view of a state where a clip 30 according to the present embodiment fixes a first plate member 10 and a second plate member 20 to each other. The first and second plate members 10, 20 are an example of a plurality of objects to be fixed to each other. FIG. 2 is a perspective view of a state where the clip 30 is separated from the first and second plate members 10, 20. FIG. 3 is a perspective view of a state where the first and second plate members 10, 20 are separated.

As illustrated in FIGS. 1 to 3, the first and second plate members 10, 20 are each formed into a plate-like shape. As illustrated in FIGS. 1 and 2, the first and second plate members 10, 20 are fixed to each other by the clip 30 in a state where they are stacked on each other. As illustrated in FIG. 3, the first plate member 10 is disposed at one end along a stacking direction of the first and second plate members 10, 20, and the second plate member 20 is disposed at the other end along the stacking direction.

In the present embodiment, a direction directed from the second place member 20 toward the first plate member 10 along a stacking direction A is set as a downward direction, and a direction directed from the first plate member 10 toward the second plate member 20 is set as an upward direction to thereby define a vertical direction with respect to the first and second plate members 10, 20. In the present embodiment, the first plate member 10 is disposed as a lowermost layer, and the second plate member 20 is as an uppermost layer.

As illustrated in FIG. 3, a protruding portion 11 is formed in the first plate member 10. The protruding portion 11 protrudes in parallel to the stacking direction A of the first and second plate members 10, 20. The protruding portion 11 has substantially a rectangular parallelepiped shape. A front shape of the protruding portion 11 as viewed in a direction (penetrating direction B to be described later) perpendicular to a protruding direction of the protruding portion 11 is substantially a quadrangle. A second through-hole 21 is formed in the second plate member 20, through which the protruding portion 11 passes when the second plate member 20 is stacked onto the first plate member 10.

A planar shape of the second through-hole 21 is substantially a quadrangle that fits the shape of the protruding portion 11. In a state where the protruding portion 11 is accommodated in the second through-hole 21, there is no gap between an inner surface of the second through-hole 21 and protruding portion 11, or a slight gap required for insertion of the protruding portion 11 into the second through-hole 21 is formed.

As illustrated in FIG. 2, the protruding portion 11 has such a size that a leading end portion 12 protrudes from the second through-hole 21. A first through-hole 13 is formed in the protruding portion 11. The first through-hole 13 penetrates the protruding portion 11 in a direction perpendicular to the protruding direction. As illustrated in FIG. 3, the first through-hole 13 has substantially a quadrangle shape. An upper surface 14 of the first through-hole 13 is a plane extending perpendicular to the vertical direction, i.e., stacking direction A. A peripheral surface 15 of the protruding portion 11 is a plane parallel to the vertical direction.

Figure 8:
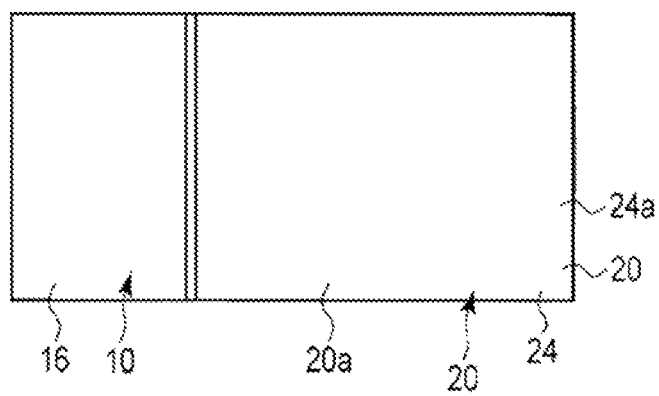
FIG. 8 is a bottom view of an integrated structure of the first and second plate members in a state where the first and second plate members are fixed to each other by the clip.

FIG. 8 is a bottom view of an integrated structure of the first and second plate members 10, 20 in a state where the first and second plate members 10, 20 are fixed to each other by the clip 30. As illustrated in FIGS. 1 and 8, in a state where the first and second plate members 10, 20 are fixed to each other by the clip 30, a lower surface 16 of the first plate member 10 and a lower surface 20a of the second plate member 20 are flush with each other.

As illustrated in FIGS. 2 and 3, the second plate member 20 has a stacking portion 23 to be stacked onto the first plate member 10 and a parallel portion 24 to be disposed parallel to the first plate member 10. The second through-hole 21 is formed in the stacking portion 23. FIG. 8 illustrates a state where the lower surface 16 of the first plate member 10 and a lower surface 24a of the parallel portion 24 are arranged side by side and flush with each other. The lower surface 24a constitutes a part of the lower surface 20a.

Thus, the stacking portion 23 and parallel portion 24 of the second plate member 20 are disposed at different positions in the stacking direction of the first and second plate members 10, 20. More specifically, the stacking portion 23 is positioned upward of the parallel portion 24. A connection portion connecting the stacking portion 23 and parallel portion 24 is formed as a step portion 25 having a step in the stacking direction between an upper surface 23a of the stacking portion 23 and an upper surface 24b of the parallel portion 24. The upper surfaces 23a, 24b are planes perpendicular to the vertical direction, i.e., stacking direction A.

As illustrated in FIG. 3, both side portions of the stacking portion 23 in a peripheral portion 23b thereof that sandwich the second through-hole 21 in a penetrating direction B of the first through-hole 13, i.e., in a direction that an inner surface of the first through-hole 13 extends are an edge portion 23c of the step portion 25 and an edge portion 23d opposed to edge portion 23c. Edge portion 23d is curved so as to protrude toward edge portion 23c. Edge portion 23c is curved so as to open toward edge portion 23d. For example, in the present embodiment, edge portions 23c and 23d are parallel to each other. A center P1 of the second through-hole 21 is positioned at a center between edge portions 23c and 23d. Edge portions 23c and 23d are each an example of a corner portion.

FIG. 4 is a perspective view of the clip 30. As illustrated in FIG. 4, the clip 30 has a clip body 40, a pair of arm portions 50, and a first rib 60. The clip body 40 is substantially rectangular in planar shape and is elongated in one direction. In the present embodiment, an extending direction of the clip body 40 is set as a first direction C.

Inside the clip body 40, the first rib 60, a detail of which will be described later, is provided at a center portion of the clip body 40 in the first direction C, and through-holes 61 are formed respectively on both sides of the first rib 60 in the first direction C. The through-holes 61 each penetrate the clip body 40 in a thickness direction thereof.

The arm portions 50 each have an arm body 51, a first inclined portion 52 and an engagement portion 53 and each one is provided at both end portions 41, 42 of the clip body 40 in the first direction C. In other words, the arm portions 50 are arranged at both end portions of the clip body 40 along a virtual line V extending parallel to the first direction C.

One arm portion 50 and the other arm portion 50 have symmetrical in shape with respect to the first rib 60. Thus, the arm portion 50 formed in the one end portion 41 of the clip body 40 in the first direction C will be described here as a representative example. Note that the same reference numerals are assigned to the components of the arm portion 50 formed in the other end portion 42 of the clip body 40.

Figure 5:
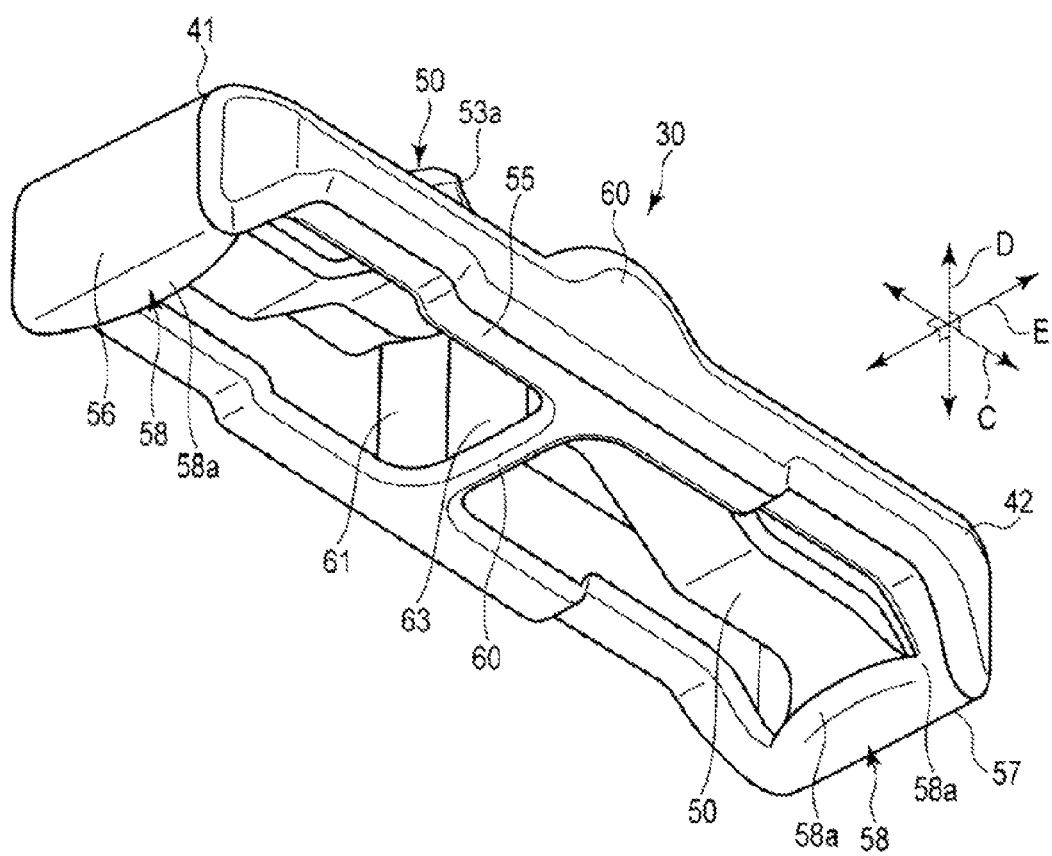
FIG. 5 is a perspective view of the clip as viewed from a different angle from FIG. 4.

FIG. 5 is a perspective view of the clip 30 as viewed from a different angle from FIG. 4. FIG. 5 illustrates the clip 30 from below. As illustrates in FIG. 4, the arm body 51 is provided at the one end portion 41 of the clip body 40 in the first direction C. The arm body 51 extends from the one end portion 41 and passes through the through-hole 61 to protrude toward the first rib 60. A gap S1 is formed between an edge portion 62 of the clip body 40 extending along the first direction C and the arm body 51.

An end portion of the first rib side of the arm body 51 is inclined toward a penetrating direction of the through-hole 61 of the clip body 40 such that an end portion of the first rib side of the arm body 51 is distanced from the clip body 40 toward the first rib 60, in other words, such that the end portion of the first rib side of the arm body 51 is distanced from the clip body 40 toward an end portion on the opposite side of the end portion on which the arm portion 50 is provided. The penetrating direction of the through-hole 61 is a direction perpendicular to the first direction C and is set as a second direction D. In the present embodiment, a direction in which the arm body 51 is distanced from the clip body 40 is set as an upward direction to define a vertical direction with respect to the clip 30.

As illustrated in FIG. 4, the first inclined portion 52 is formed at a leading end portion of the arm body 51. The first inclined portion 52 does not contact the first rib 60. In other words, a gap S2 is formed between the first inclined portion 52 and first rib 60. An upper surface of the first inclined portion 52 is formed as a first inclined surface 52a. The first inclined surface 52a is a plane parallel to a third direction E which is perpendicular to the first and second directions C, D and inclined relative to the vertical direction, i.e., the second direction D so as to fall as it approaches the first rib 60. In other words, the first inclined surface 52a extends such that a leading end thereof approaches the clip body 40.

The engagement portion 53 is formed at an upper portion of the first inclined portion 52. The first inclined portion 52 is positioned closer to the leading end side of the arm portion 50 than the engagement portion 53 is to the leading end side. A surface of the engagement portion 53 that faces the first rib side is formed as an engagement surface 53a. The engagement surface 53a is a plane perpendicular to the first direction C. An upper surface 50a of the arm portion 50 is inclined relative to the second direction D, i.e., vertical direction so as to fall as it approaches the one end portion 41 of the clip body 40.

When the first inclined portion 52 of the arm portion 50 is pushed downward, portions (connection portion between the arm portion and clip body 40, etc.) of the arm portion 50 other than the first inclined portion 52 are elastically deformed, causing the first inclined portion 52 and engagement portion 53 to be displaced downward. That is, the engagement portion 53 and first inclined portion 52 can elastically be displaced relative to the clip body 40. After removal of a load pushing downward the first inclined portion 52, elastic force of the arm portion 50 causes the first inclined portion 52 and engagement portion 53 to return their original positions. In the present embodiment, the clip 30 is formed of resin, so that the first inclined portion 52 is easily elastically displaced.

Figure 6:
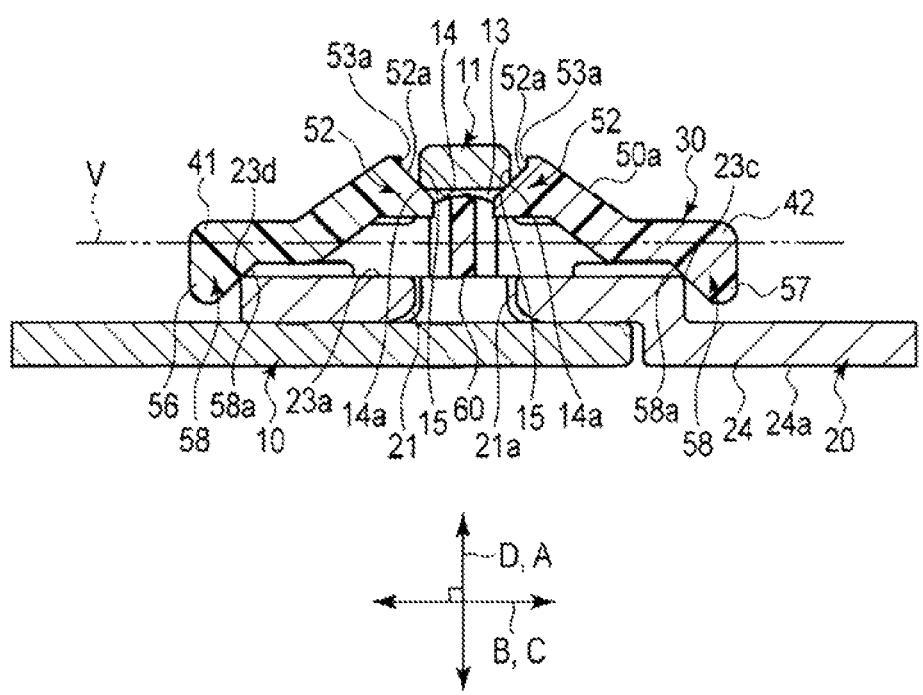
FIG. 6 is a cross-sectional view of the clip, first plate member, and second plate member, taken along line F6-F6 of FIG. 1.

FIG. 6 is a cross-sectional view of the clip 30, first plate member 10, and second plate member 20, taken along line F6-F6 of FIG. 1. FIG. 6 illustrates a state where the clip 30, first plate member 10, and second plate member 20 are cut along a cross-sectional line parallel to the penetrating direction B of the first through-hole 13 of the protruding portion 11 that passes a center P2 of the first through-hole 13 in a width direction F. The width direction F is a direction perpendicular to the stacking direction A and penetrating direction B.

In the state illustrated in FIG. 6, the vertical direction of the clip 30 and vertical direction of the first and second plate members 10 and 20, i.e., the second direction D and stacking direction A coincide with each other. Further, in FIG. 6, the first direction of the clip 30 is parallel to the penetrating direction B of the first through-hole 13, and the third direction E of the clip 30 is parallel to the width direction F of the protruding portion 11.

As illustrated in FIGS. 5 and 6, second inclined portions 58 are formed respectively on both end portions 56, 57 of a lower end portion 55 of the clip body 40 in the first direction C. The second inclined portions 58 each protrude downward from the clip body 40. The second inclined portions 58 each have a second inclined surface 58a. The second inclined surface 58a is a surface of the second inclined portion 58 (second inclined portion 58 at one end portion) on a side that faces the second inclined portion 58 at the other end. The second inclined surface 58a extends toward the through-hole 61. More in detail, the second inclined surface 58a is inclined relative to the vertical direction, i.e., the stacking direction A so as to extend upward toward the clip body 40 as it approaches the other end second inclined portion 58.

Figure 7:
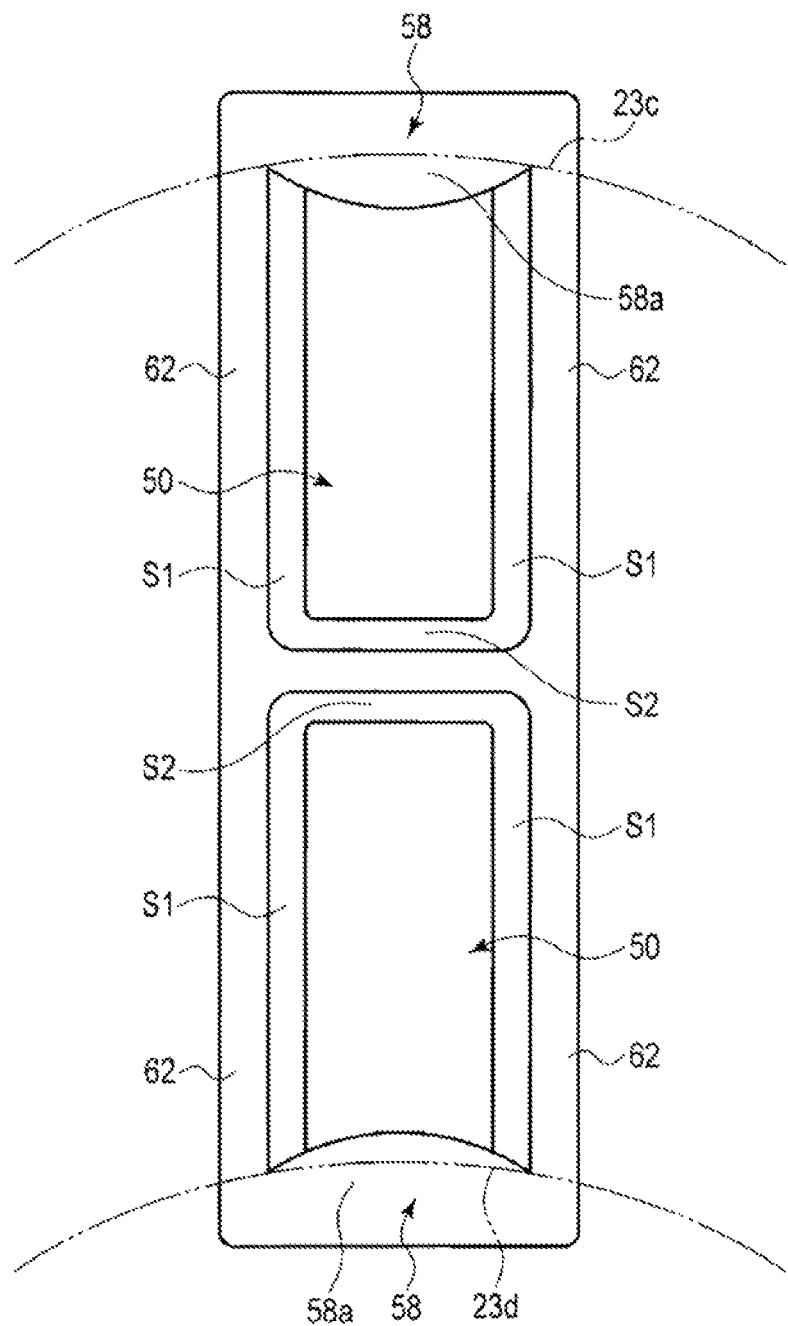
FIG. 7 is a bottom view of the clip.

The second inclined surface 58a is curved so as to protrude toward the other end second inclined portion 58 side. That is, the second inclined surface 58a is designed to be inclined relative to the stacking direction A as described above and to protrude toward the other end second inclined portion 58 side. FIG. 7 illustrates a bottom surface of the clip 30 as viewed upward from below. As illustrated in FIG. 7, the second inclined surface 58a protrudes toward the other end second inclined portion 58.

A shape of the second inclined surface 58a will be described more specifically. As illustrated in FIG. 6, in a state where the second inclined surface 58a is cut, the line illustrating the second inclined surface 58a is represented as a straight line. Similarly, any portion of the second inclined surface 58a other than what is illustrated in FIG. 6 will be represented as a straight line as illustrated in FIG. 6, if it is in the same cut state as FIG. 6. Further, as illustrated in FIG. 7, a center portion of the second inclined surface 58a in the third direction E protrudes toward the other end second inclined portion 58.

Here, a size of the clip body 40 and that of the pair of arm portions 50 will be described. As illustrated in FIG. 6, in a state where the protruding portion 11 of the first plate member 10 is fitted through the second through-hole 21 of the second plate member 20, the clip 30 is inserted between the upper surface 14 of the first through-hole 13 and second plate member 20 in such a manner that the first direction C is parallel to the penetrating direction B of the first through-hole 13, whereby the first and second plate members 10, 20 are fixed to each other.

The clip body 40 has such a size that the second inclined surface 58a of one end of the second inclined portion 58 is disposed on edge portion 23d of the second plate member 20 and that the second inclined surface 58a of the other end second inclined portion 58 is disposed on edge portion 23c of the step portion 25 in the first direction C.

The pair of arm portions 50 have such a size that the first inclined surface 52a of the first inclined portion 52 on one side abuts against an edge portion 14a of the upper surface 14 of the first through-hole 13 in a state where the one side first inclined portion 52 is displaced downward and that the first inclined surface 52a of the first inclined portion 52 on the other side abuts against an edge portion 14a of the upper surface 14 of the first through-hole 13 in a state where the other side first inclined portion 52 is displaced downward.

As described above, in a state illustrated in FIG. 6, the second inclined surfaces 58a abut against edge portions 23c and 23d of the second plate member 20, respectively, and the first inclined surfaces 52a abut against edge portion 14a of the upper surface 14 of the first through-hole 13. The first inclined portion 52 is displaced downward and is thus biased upward by the elastic force of the arm portion 50. Thus, each of the first inclined surfaces 52a abuts against edge portion 14a in a state that it is biased from below.

Further, although edge portions 23c and 23d are curved, any portion of each of the second inclined surfaces 58a abut against edge portion 23c or 23d since the second inclined surfaces 58a protrude toward each other. In other words, at least one point of each of the second inclined surfaces 58a contacts any portion of edge portion 23c or 23d.

In FIG. 7, edge portions 23c and 23d that contact the respective second inclined surfaces 58a are denoted by long dashed doubled-dotted lines. FIG. 7 illustrates a state where the second inclined surfaces 58a contact curved edge portions 23c and 23d, respectively.

As illustrated in FIG. 4, the first rib 60 is provided at a center portion of the clip body 40 in the first direction C and extends in the third direction E. Concave portions 63 are formed on both sides of the first rib 60 so as not to contact the first inclined portions 52 when the first inclined portions 52 of the respective arm portions 50 are displaced in the vertical direction, i.e., the second direction D. As illustrated in FIG. 6, in a state where the clip 30 fixes the first and second plate members 10, 20 to each other, the first rib 60 is fitted inside the first through-hole 13. As illustrated in FIG. 1, a width L1 of the clip body 40 in the third direction E is constant at any position of the clip body 40 in the first direction C and is equal to a width L2 of the first through-hole 13 in the width direction F, as illustrated in FIG. 3 or slightly smaller than the width L2 of the first through-hole 13 for easy insertion of the clip 30 into the first through-hole 13. A width of the first rib 60 in the third direction E is also L1. As described above, in the present embodiment, the first rib 60 is fitted inside the first through-hole 13 with L1 being equal to L2, or with L2 being slightly smaller than L1. The first rib 60 protrudes upward from the clip body 40.

The following describes an example of an operation of assembling the clip 30 to the first through-hole 13. First, as illustrated in FIG. 2, the protruding portion 11 of the first plate member 10 is fitted through the second through-hole 21 of the second plate member 20.

Subsequently, an attitude of the clip 30 is adjusted. More specifically, the vertical direction of the clip 30 and that of the first and second plate members 10, 20 are made to coincide with each other, and the first direction C of the clip 30 and penetrating direction B of the first through-hole 13 are made to coincide with each other, whereby the mutual positions of the clip 30 and first through-hole 13 are adjusted.

Subsequently, the clip 30 is pushed into the first through-hole 13 along the first direction C. At this time, the upper surface 50a of the arm portion 50 which is one of the both arm portions 50 that is disposed forward of the other in a pushing direction abuts against edge portion 14a of the upper surface 14 of the first through-hole 13. When the clip 30 is pushed further in this state, the forward-positioned arm portion 50 is pressed downward by edge portion 14a to be elastically deformed downward. In other words, the forward-positioned arm portion 50 in the pushing direction is pushed downward. As the clip 30 is pushed into the first through-hole 13, the forward-positioned arm portion 50 in the pushing direction is pushed further downward.

In the rearward-positioned arm portion 50 in the pushing direction, the inclined surface 52a of the first inclined portion 52 abuts against edge portion 14a of the upper surface 14 of the first through-hole 13. When the clip 30 is pushed further into the first through-hole 13, the first inclined surface 52a of the rearward-positioned arm portion 50 in the pushing direction is pressed downward by edge portion 14a of the first through-hole 13, with the result that the rearward-positioned arm portion 50 in the pushing direction is pushed downward.

Then, as illustrated in FIG. 6, when edge portion 14a of the upper surface 14 of the first through-hole 13 runs on the engagement portion 53 of the forward-positioned arm portion 50 in the pushing direction, the forward-positioned arm portion 50 in the pushing direction is returned upward by the elastic force thereof until edge portion 14a of the upper surface 14 of the first through-hole 13 abuts against the first inclined surface 52a.

In FIG. 6, as described above, the both arm portions 50 are displaced downward by being pushed by edge portion 14a of the upper surface 14 of the first through-hole 13. Therefore, the first inclined surfaces 52a of the both arm portions 50 biases edge portion 14a of the upper surface 14 of the first through-hole 13 upward from below by the elastic force of the arm portions 50.

The first inclined surface 52a of the forward-positioned arm portion 50 in the pushing direction biases upward edge portion 14a of the upper surface 14 of the first through-hole 13, so that edge portion 14a is guided downward along the first inclined surface 52a, whereby the clip 30 is biased so as to move in the pushing direction.

On the other hand, the first inclined surface 52a of the rearward-positioned arm portion 50 in the pushing direction biases upward edge portion 14a of the upper surface 14 of the first through-hole 13 from below, so that edge portion 14a is guided downward along the first inclined surface 52a, whereby the clip 30 is biased so as to move in an opposite direction to the pushing direction.

The both arm portions 50 have the same configuration and, therefore, the biasing forces of the first inclined surfaces 52a of the both arm portions 50 to edge portion 14a of the upper surface 14 of the first through-hole 13 are the same, so that the clip 30 is positioned at a location where the biasing force with respect to the protruding portion 11 causing the clip 30 to move in the pushing direction and biasing force with respect to the protruding portion 11 causing the clip 30 to move in the opposite direction to the pushing direction are balanced. That is, the clip 30 is positioned such that the first rib 60 is fitted inside the first through-hole 13.

The clip 30 has a shape symmetrical with respect to the first rib 60 in the first direction C and, thus, either end portion 41 or 42 of the clip 30 may be inserted into the first through-hole 13.

When an attempt is made to pull out the clip 30 in the state illustrated in FIG. 6, the rearward-positioned arm portion 50 in a pull-out direction is pushed downward such that edge portion 14a of the upper surface 14 of the first through-hole 13 moves relatively, on the first inclined surface 52a, toward the engagement portion 53.

As a result, the engagement surface 53a of the engagement portion 53 abuts against the peripheral surface 15 of the protruding portion 11 in the first direction C. The engagement surface 53a and peripheral surface 15 are parallel to each other. That is, the engagement surface 53a abuts against the peripheral surface 15 in the pull-out direction to be engaged with the peripheral surface 15, thus preventing the clip 30 from moving in the pull-out direction any more. The state described above where the engagement surface 53a of the engagement portion 53 and peripheral surface 15 of the protruding portion 11 when an attempt is made to pull out the clip 30 is an example of an engageable state referred to in the present invention.

The following describes an example of an operation of pulling out the clip 30 from the first through-hole 13. First, one of the engagement portions 53 of both the arm portions 50 is pushed down to a position at which the engagement surface 53a thereof does not contact the peripheral surface 15 of the first through-hole 13 in the pull-out direction. In this state, the clip 30 is pulled out. That is, in this state, the engagement surface 53a of the engagement portion 53 and peripheral surface 15 are not engaged with each other, thus making it possible for the clip 30 to be pulled out.

Thus, simply by forming the protruding portion 11 in the first plate member 10 and forming the second through-hole 21 in the second plate member 20, the first and second plate members 10, 20 can be fixed to each other using the clip 30 having the above configuration. It is possible to fix the first and second plate members 10, 20 without requiring a complicated configuration therefor.

For example, in fixing two members constituting a cowl of a motorcycle to each other using the clip 30, simply by forming a protruding portion similar to the protruding portion 11 in one of the two members and forming a through-hole similar to the second through-hole 21 in the other one thereof, it is possible to achieve fixation between the two members using the clip 30. Further, the fixation can be achieved only by forming the protruding portion and through-hole, so that external appearance of the cowl is not impaired.

As described above, an integrated structure can be obtained not by multi-color molding but by fixation between a plurality of objects to be fixed, limitation of design options due to requirements of high skill for the multi-color molding can be avoided.

The engagement portion 53 is supported so as to be elastically displaceable with respect to the clip body 40, that is, the arm portion 50 can be elastically deformed, so that it is only necessary to push down the engagement portion 53 in pulling out the clip 30 from the first through-hole 13. After the clip 30 has been pulled out from the first through-hole 13, a position of the engagement portion 53 is returned to its original position by the elastic force of the arm portion 50. This configuration simplifies the pull-out operation of the clip 30. A displacement range of the arm portion 50 when the engagement portion 53 is pushed down to the position at which the engagement between the engagement portion 53 and peripheral surface 15 of the protruding portion 11 is released is within elastic deformation of the arm portion 50. Thus, plastic deformation is not left in the arm portion 50.

The first inclined portion 52 biases upward from below edge portion 14a of the upper surface 14 of the first through-hole 13, so that the clip body 40 is biased downward by reaction. Accordingly, the second inclined surfaces 58a of the second inclined portions 58 are biased so as to be pushed against edge portions 23c and 23d of the second plate member 20, respectively, so that a state where the second inclined surfaces 58a and edge portions 23c and 23d always contact each other is maintained. As a result, backlash of the clip 30 with respect to the first and second plate members 10, 20 is suppressed.

A part of the clip body 40 that abuts against the second plate member 20 is set to the second inclined surfaces 58a. Thus, it is possible for the second inclined surfaces 58a to change their contact points with edge portions 23c and 23d in accordance with an interval between edge portions 23c and 23d, thereby always allowing simultaneous contact with edge portions 23c and 23d. As a result, the backlash of the clip 30 with respect to the first and second plate members 10, is further suppressed.

The second inclined surfaces 58a have a shape protruding toward the other end second inclined portion 58, so that even if edge portions 23c and 23d are curved, at least one point of each of the second inclined surfaces 58a contacts edge portion 23c or 23d. Although edge portions 23c and 23d are parallel to each other in the present embodiment, at least one point of each of the second inclined surfaces 58a contacts edge portion 23c or 23d even if edge portions 23c and 23d are not parallel to each other, preventing the clip 30 from being made unstable due to non-contact between the second inclined surface 58a and edge portion 23c or 23d.

The first rib 60 is fitted inside the first through-hole 13 to prevent a relative displacement from occurring between the first and second plate members 10, 20. A more specific description will be made below on this point.

For a relative displacement between the first and second plate members 10, 20 in the width direction F thereof, the first rib 60 contacts the inner surface of the first through-hole 13 to prevent the displacement from being increased. Since the first rib 60 is fitted inside the first through-hole 13 in the width direction F, the increase in the relative displacement between the first and second plate member 10, 20 in the width direction F can be further prevented. For a relative displacement between the first and second plate members 10, 20 in the vertical direction thereof, the first rib 60 contacts the upper surface 14 of the first through-hole 13 to prevent the displacement from being increased. The first rib 60 protrudes upward from the clip body 40. This can reduce a gap between the first rib 60 and upper surface 14 of the first through-hole 13, thereby further reducing the relative displacement between the first and second plate members 10, 20.

Formation of the first rib 60 increases rigidity of the clip 30. Further, if the relative displacement occurs between the first and second plate members 10, 20, a load causing the displacement acts on the first rib 60 having high rigidity to make it possible to reduce deformation of the clip 30, thereby further reducing the relative displacement between the first and second plate members 10, 20.

A clip according to a second embodiment of the present invention will be described with reference to FIGS. 9 to 13. The same reference numerals are assigned to the components having the similar functions as those of the first embodiment, and descriptions thereof will be omitted. In the present embodiment, configurations of the first and second plate members 10, 20 and clip 30 differ from those of the first embodiment.

Figure 9:
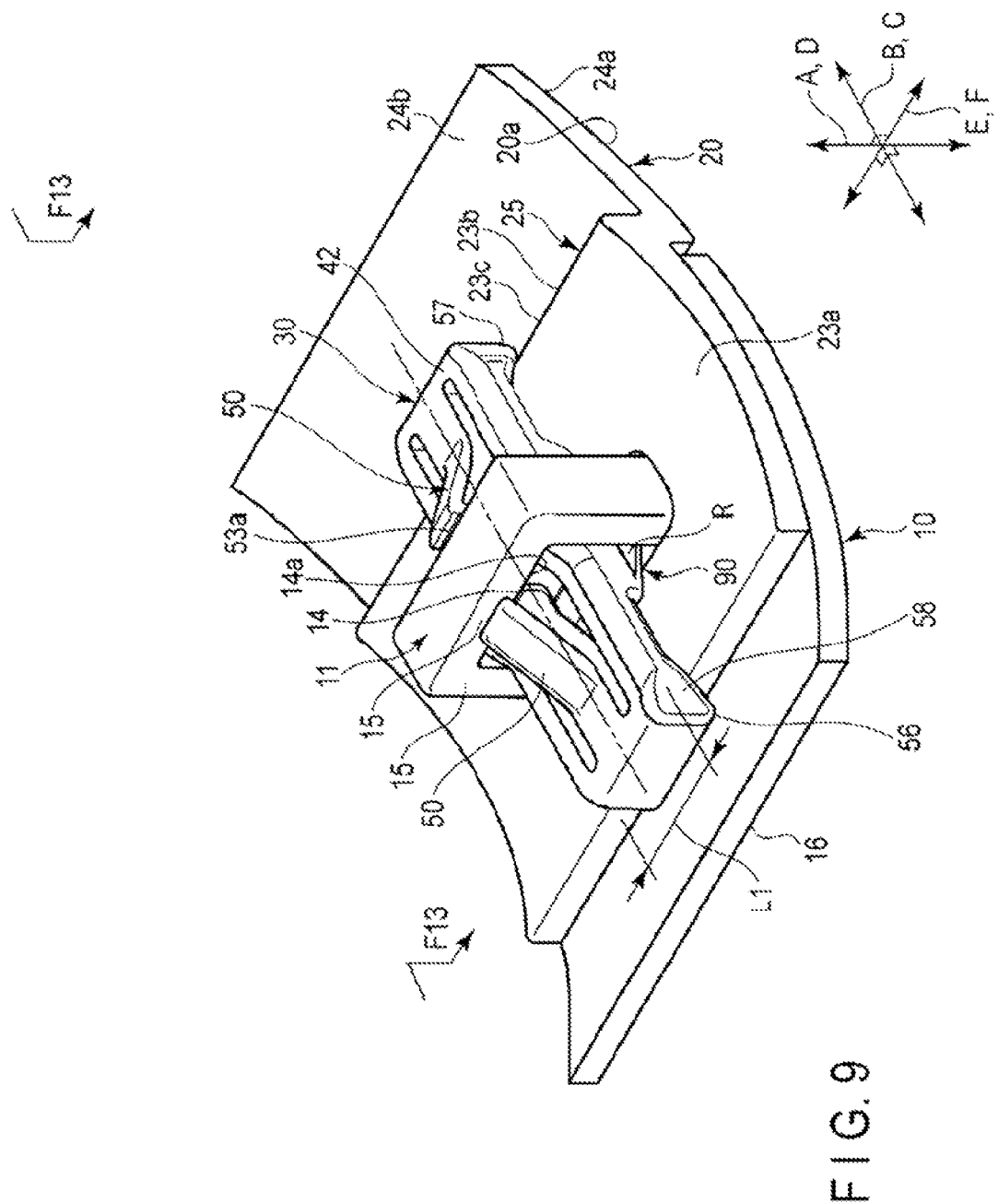
FIG. 9 is a perspective view of a state where a clip according to a second embodiment of the present invention fixes the first and second plate members to each other.

FIG. 9 is a perspective view of a state where a clip 30 according to the present embodiment of the present invention fixes first and second plate members 10, 20 to each other. FIG. 10 is a perspective view of a state where the clip 30 is separated from the first and second plate members 10, 20. In FIG. 10, the first and second plate members 10, 20 are in an assembled state wherein a protruding portion 11 of the of the first plate member 10 is inserted through the second through-hole 21 of the second plate member 20. FIG. 11 is a perspective view of a state where the first and second plate members 10, 20 are separated.

As illustrated in FIGS. 9 to 11, the first plate member 10 has a shape curved so as to open toward the second plate member 20 in a state where the first and second plate members 10, 20 are stacked. The second plate member 20 has a shape curved in accordance with the curved shape of the first plate member 10. The shape curved in accordance with the curved shape of the first plate member 10 means that when the first and second plate members 10, 20 are stacked, the first and second plate members 10, 20 surface-contact each other such that there is no gap occurring between the first and second plate members 10, 20 in a stacking direction A. That is, an upper surface 23a of the second plate member 20 is curved so as to open upward.

Further, edge portions 23c and 23d of the second plate member 20 differ from those of the first embodiment. In the present embodiment, edge portion 23c and 23d each linearly extend perpendicular to a penetrating direction B of the first through-hole 13 of the protruding portion 11, i.e., extend perpendicular to a direction that an inner surface of the first through-hole 13 extends. The penetrating direction B is a direction perpendicular to the stacking direction A. Edge portions 23c and 23d are parallel to each other. A center P1 of the second through-hole 21 is positioned at a center between edge portions 23c and 23d in the penetrating direction B. Points other than the above as to the first and second plate members 10, 20 are the same as those in the first embodiment.

Figure 12:
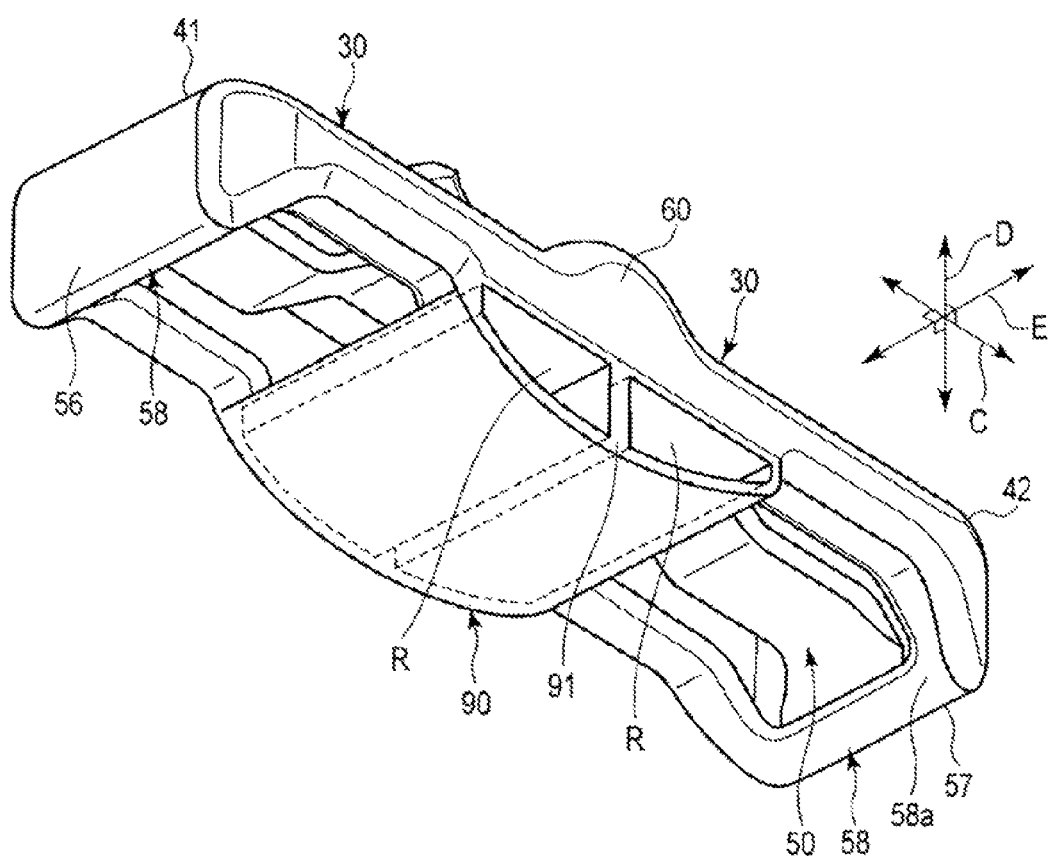
FIG. 12 is a perspective view of the clip according to the second embodiment.

FIG. 12 is a perspective view of the clip 30 according to the second embodiment as viewed from below. As illustrated in FIG. 12, the clip 30 has a bulging portion 90. The bulging portion 90 is formed below a first rib 60. The bulging portion 90 bulges downward in a curved state.

FIG. 13 is a cross-sectional view illustrating a state where the clip 30 fixes the first and second plate members 10, 20 and is similarly cut as FIG. 6 of the first embodiment. As illustrated in FIGS. 12 and 13, a space R is formed inside the bulging portion 90. For example, in the present embodiment, two spaces R are arranged along a first direction C of a clip body 40. The bulging portion 90 has a symmetrical shape with respect to a center of the clip body 40 in the first direction C.

The spaces R each penetrate the bulging portion 90 in a third direction E. That is, the spaces R each open both end surfaces of the bulging portion 90 in the third direction E. The bulging portion 90 has a structure in which the space R is surrounded by a comparatively thin wall portion 91 by forming the pair of spaces R in the bulging portion 90.

Thus, when external force is applied to the bulging portion 90, the wall portion 91 is deformed against the force. The bulging portion 90 is formed of the same material as that of the clip body 40. For example, the bulging portion 90 is formed of resin and is therefore easily elastically deformed. The spaces R have such a size that the bulging portion 90 can be elastically deformed by the external force without being destroyed or plastically deformed.

Further, the clip 30 according to the present embodiment differs from that of the first embodiment in shape of a second inclined surface 58a of a second inclined portion 58. In the present embodiment, the second inclined surface 58a extends toward a through-hole 61 and is a plane parallel to the third direction E. The second inclined surface 58a is inclined relative to the vertical direction, i.e., stacking direction A upward, i.e., toward the clip body 40 as it approaches the second inclined portion 58 on the other side.

The clip body 40 has such a size that the second inclined surface 58a of one end of the second inclined portion 58 is disposed on edge portion 23c of the second plate member 20 and that the second inclined surface 58a of the other end second inclined portion 58 is disposed on edge portion 23d of the step portion 25 in the first direction C.

The components of the clip 30 other than the second inclined surface 58a and bulging portion 90 are the same as those of the first embodiment.

As illustrated in FIG. 13, in a state where the clip 30 is accommodated in the first through-hole 13 to fix the first and second plate members 10, 20, a lower surface of the clip 30 faces an upper surface 23a of the second plate member 20.

The bulging portion 90 bulges downward, so that in the state where the clip 30 is accommodated in the first through-hole 13 to fix the first and second plate members 10, 20 as illustrated in FIG. 13, a bulging top of the bulging portion 90 contacts the upper surface 23a of the second plate member 20.

The clip 30 is biased downward by reaction against the biasing force of the arm portions 50. Further, as described above, the bulging portion 90 is formed so as to be elastically deformable. Thus, the bulging portion 90 is deformed so as to be accommodated in a gap between the clip 30 and upper surface 23a of the second plate member 20.

The clip 30 is biased upward by elastic force of the bulging portion 90 caused by the deformation thereof, which further increases fixing force between the first and second plate members 10, 20. In FIG. 13, the bulging portion 90 before deformation is denoted by a long dashed doubled-dotted line.

The upper surface 23a of the second plate member 20 is curved so as to open upward. Thus, in a state where the second inclined surfaces 58a contact edge portions 23c and 23d, a gap between the lower surface of the clip 30 and second inclined surfaces 58a is increased.

However, since the bulging portion 90 is accommodated in the gap between the clip 30 and upper surface 23a of the second plate member 20, it is possible to prevent the clip 30 from being made unstable due to the increase in the gap between the clip 30 and upper surface 23a of the second plate member 20.

The bulging portion 90 described in the second embodiment may be applied to the clip 30 of the first embodiment.

The bulging portion 90 is formed so as to be elastically deformable by having thereinside the spaces R. Alternatively, the bulging portion 90 may be formed of elastically deformable rubber. It is preferable to form the spaces R inside the bulging portion 90 as in the second embodiment, since the bulging portion 90 can be integrally formed with the clip body 40.

In the first embodiment, the second inclined portion 58 is an example of a protruding portion referred to in the present invention. In the second embodiment, the second inclined portion 58 is an example of a first protruding portion referred to in the present invention, and the bulging portion 90 is an example of a second protruding portion referred to in the present invention.

In both the first and second embodiments, the first inclined portion 52 is an example of a first portion as referred to in the present invention, and the second inclined surface 58a is an example of a second portion referred to in the present invention.

In both the first and second embodiments, the first and second plate members 10, 20 are used as an example of the objects to be fixed to each other; however, the objects to be fixed axe not limited to these two members. The clip 30 can fix a plurality of objects to be fixed. Further, in both the first and second embodiments, the first plate member 10 is an example of a first object to be fixed referred to in the present invention, and the second plate member 20 is an example of a second object to be fixed referred to in the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A clip system, comprising a clip for fixing and a plurality of objects to be fixed in a stacked state containing first and second objects to be fixed,
    the first object to be fixed being disposed as a lowermost layer and having a protruding portion protruding in the stacking direction and a first through-hole formed in the protruding portion,
    the second object to be fixed being disposed as an upper most layer and having a second through-hole formed therein, the clip comprising:
    a clip body that can be accommodated between the first through-hole and second object to be fixed in a state where the protruding portion of the first object to be fixed is inserted through the second through-hole of the second object to be fixed;
    displacement portions provided on both end portions of the clip body along a virtual line set with respect to the clip body and extending in a penetrating direction of the first through-hole in a state where the clip body is accommodated in the first through-hole, the displacement portions each extending toward each other;
    engagement portions provided at leading end side of the displacement portions so as to protrude from the clip body, the engagement portions being engaged with the protruding portion of the first object to be fixed when the clip body in an engageable state where it is accommodated in the first through-hole in an attitude in which the vertical line follows the penetrating direction of the first through-hole is pulled out from the first through-hole and being reduced in protruding amount from the clip body by the elastic deformation of either of the displacement portions; and
    curved protruding portions provided at both end portions of the clip body on an opposite side to the protruding side of the engagement portion from the clip body and along the virtual line so as to protrude from the clip body, the curved protruding portions each being engaged with a curved corner portion formed in the second object to be fixed when the clip body is engaged and the curved protruding portions protrude in a curved manner toward each other.

2. The clip system according to claim 1, further comprising:
    a first portion provided in each of the displacement portions, and extending such that an leading end thereof approaches the clip body; and
    an inclined surface formed at an end portion of each of the curved protruding portions on a side that faces the curved protruding portion at the other end.

3. The clip system according to claim 2, wherein a vertical wall portion crossing the virtual line is provided between the both end portions of the clip body.

4. The clip system according to claim 1, wherein a vertical wall portion crossing the virtual line is provided between the both end portions of the clip body.

5. A clip system, comprising a clip for fixing and a plurality of objects to be fixed in a stacked state containing first and second objects to be fixed,
    the first object to be fixed being disposed as a lowermost layer and having a protruding portion protruding in the stacking direction and a first through-hole formed in the protruding portion,
    the second object to be fixed being disposed as an upper most layer and having a second through-hole formed therein, the clip comprising:
    a clip body that can be accommodated between the first through-hole and second object to be fixed in a state where the protruding portion of the first object to be fixed is inserted through the second through-hole of the second object to be fixed;
    displacement portions provided on both end portions of the clip body along a virtual line set with respect to the clip body and extending in a penetrating direction of the first through-hole in a state where the clip body is accommodated in the first through-hole, the displacement portions each extending toward each other;
    engagement portions provided at an leading end side of the displacement portions so as to protrude from the clip body, the engagement portion being engaged with the protruding portion of the first object to be fixed when the clip body in an engageable state where it is accommodated in the first through-hole in an attitude in which the virtual line follows the penetrating direction of the first through-hole is pulled out from the first through-hole and being reduced in protruding amount from the clip body by the elastic deformation of either of the displacement portions;
    first protruding portions provided at both end portions of the clip body on an opposite side to a protruding side of the engagement portion from the clip body and along the virtual line so as to protrude from the clip body, the first protruding portions each being engaged with a corner portion formed in the second object to be fixed when the clip body is engaged and the first protruding portions protrude toward each other; and
    a second protruding portion provided in the clip body on an opposite side thereof to the protruding side of the engagement portion from the clip body so as to protrude from the clip body.

6. The clip system according to claim 5, wherein the second protruding portion is formed so as to be elastically deformable.

7. The clip system according to claim 6, wherein the second protruding portion is formed so as to be elastically deformable by having inside thereof a space.

8. The clip system according to claim 7, wherein a vertical wall portion crossing the virtual line is provided between the both end portions of the clip body.

9. The clip system according to claim 6, wherein a vertical wall portion crossing the virtual line is provided between the both end portions of the clip body.

10. The clip system according to claim 5, further comprising:
   a first portion provided in each of the displacement portions, and extending such that an leading end thereof approaches the clip body; and
   an inclined surface formed at an end portion of each of the first portions on a side that faces the first portion at the other end.

11. The clip system according to claim 10, wherein a vertical wall portion crossing the virtual line is provided between the both end portions of the clip body.

12. The clip system according to claim 5, wherein a vertical wall portion crossing the virtual line is provided between the both end portions of the clip body.

\* \* \* \* \*